Patented July 25, 1944

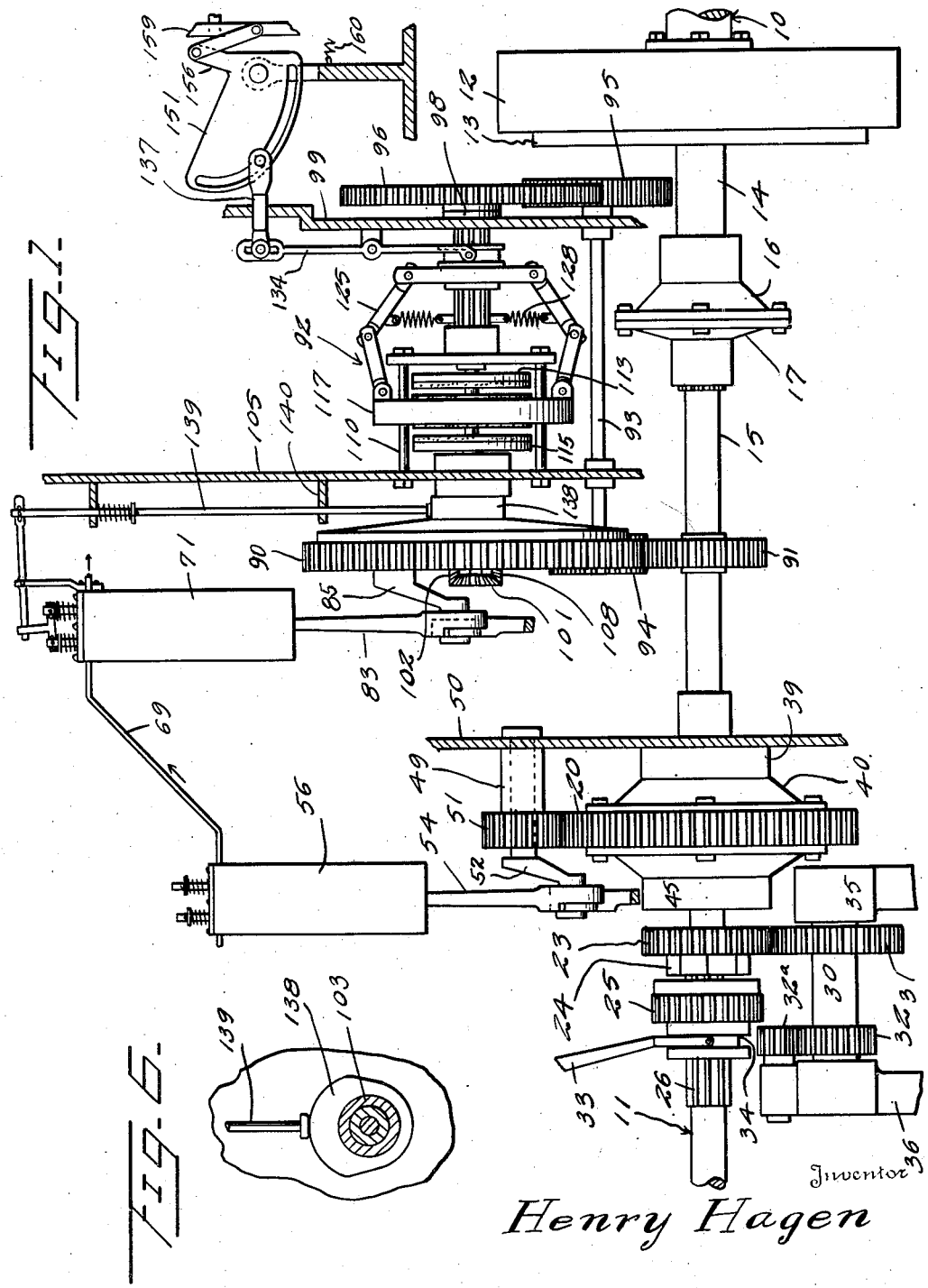

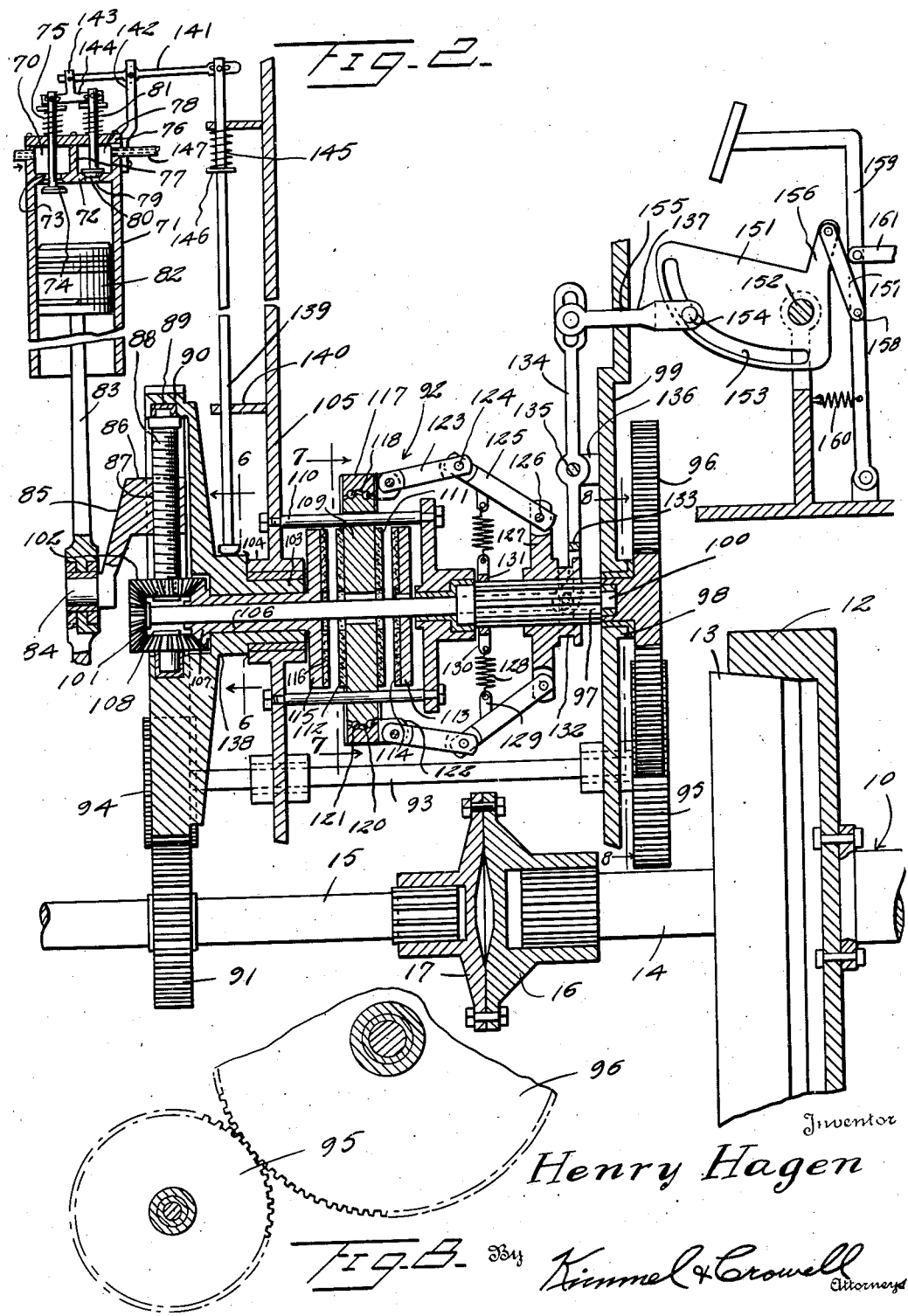

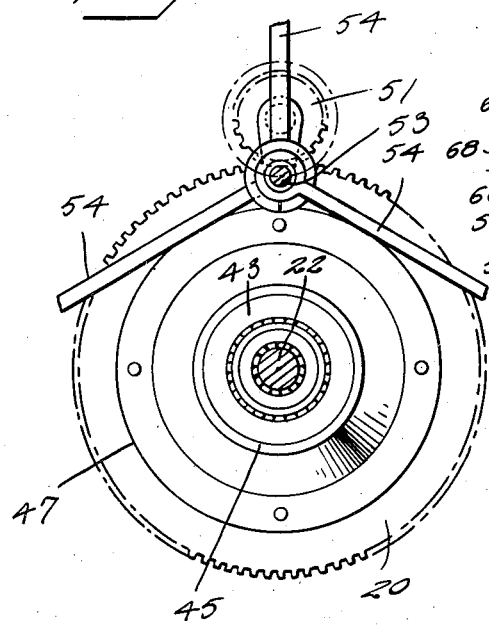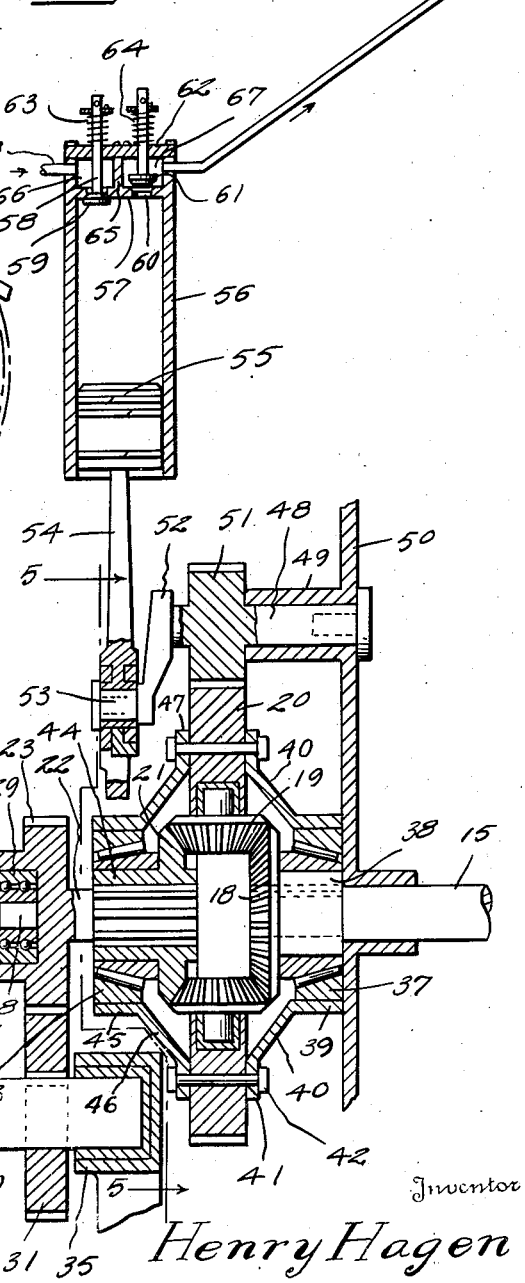

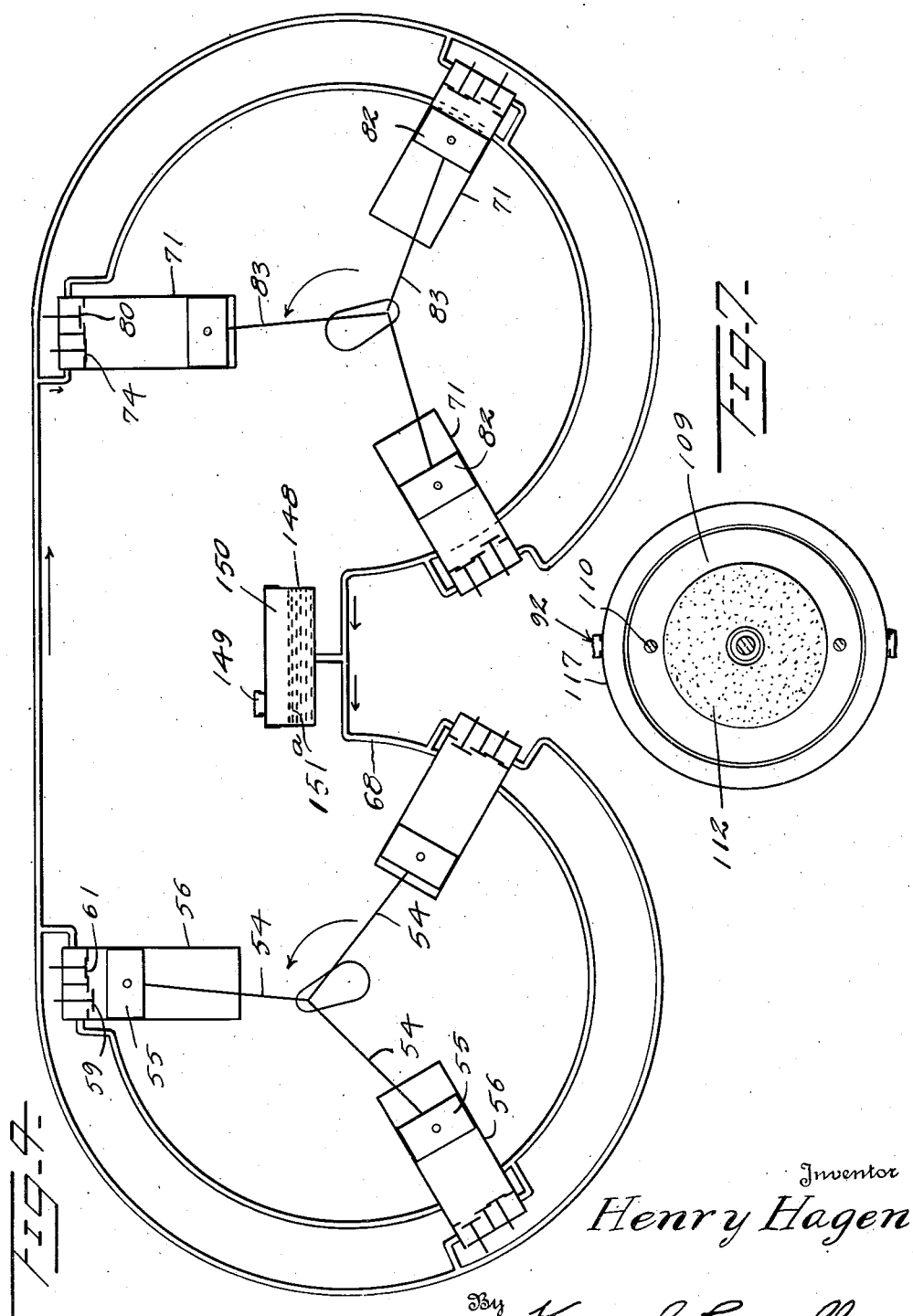

2,354,456

UNITED STATES PATENT OFFICE 2,354,456

HYDRAULIC TRANSMISSION

Henry Hagen, Lansing, Mich., assignor of one-half to Justin Phelps, Lansing, Mich.

Application February 20, 1942, Serial No. 431,757

3 Claims. (Cl. 74—189.5)

This invention relates to an automatic hydraulic transmission.

An object of this invention is to provide a transmission including driving and driven elements and centrifugally operated means connected with the driven elements for retarding the operation of said elements.

Another object of this invention is to provide a plurality of radially arranged interconnected pumping elements and centrifugally operated means correlated with certain of said elements for providing a braking effect on the flow of liquid to thereby automatically render said elements inactive.

A further object of this invention is to provide an automatically operated speed changing device which will provide a smooth change in speed.

A further object of this invention is to provide in a closed transmission system of this kind a compensating reservoir for compensating for the variations in the exchange of fluid from one series of pumping elements to another series.

A further object of this invention is to provide a transmission including constantly meshing gears, and hydraulic centrifugally controlled means for retarding the rotation of certain of the gears.

A further object of this invention is to provide a transmission wherein an increase in load on the driven shaft will effect a decrease in the speed of the driven unit relative to the driving unit, and conversely a decrease in the load on the driven shaft will effect an increase in the speed of the driven unit relative to the driving unit.

To the foregoing objects and others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

In the drawings:

Figure 1 is a detail side elevation partly broken away and in section of a hydraulic transmission constructed according to an embodiment of this invention, Figure 2 is a vertical section partly broken away of the driven unit incorporated in this transmission, Figure 3 is a vertical section of the driving unit incorporated in this transmission, Figure 4 is a diagrammatic view of the transmission, Figure 5 is a sectional view taken on the line 5—5 of Figure 3, Figure 6 is a sectional view taken on the line 6—6 of Figure 2, Figure 7 is a sectional view taken on the line 7—7 of Figure 2, and Figure 8 is a sectional view taken on the line 8—8 of Figure 2.

Referring to the drawings, the numeral 10 designates generally a drive shaft and the numeral 11 designates generally a driven shaft which is adapted to be connected to the drive shaft 10 by means of a transmission or coupling structure to be hereinafter described. A pair of clutch elements 12 and 13 are interposed between the drive shaft 10 and the driven shaft 11, the clutch element 13 being secured to an intermediate shaft 14 disposed between the two shafts 10 and 11. A second intermediate shaft 15 is interposed between the shaft 14 and the shaft 11, being coupled to the shaft 14 by means of detachable coupling elements 16 and 17.

The shaft 15 has secured to the rear end thereof a beveled gear 18 which is in mesh with a plurality of radially arranged pinions or beveled gears 19 rotatably carried by a ring gear 20. The beveled gears 19 constitute planetary gears and are in mesh with a gear 21 confronting the gear 18 and which is secured to a stub shaft 22. The stub shaft 22 has fixed to the rear end thereof a spur gear 23 which is formed in its rear portion with a clutch element 24. A spur gear 25 is mounted on the splined forward end portion 26 of the driven shaft 11 and is formed in its forward face with a clutch element 27 engageable with the clutch element 24, so as to couple the two gears 23 and 25 together.

The forward end of the driven shaft 11 is formed with a reduced stub shaft 28 and an anti-friction bearing 29 is disposed about the stub shaft 28 and within the clutch element 24. The clutch element 27 may be a toothed or socket clutch element engageable with the clutch element 24 so that when these clutch elements 24 and 27 are in contact with each other, the two gears 24 and 25 will rotate as a unit. A jack shaft 30 is disposed in offset parallel relation with respect to the driven shaft 11 and has secured thereto a pair of spaced apart gears 31 and 32 constituting reversing gears. The gear 25, when moved rearwardly by means of a shifting fork 33 engageable in a grooved collar 34 carried by the gear 25, is adapted to engage a gear 32a meshing with the gear 32 so that the driven shaft 11 will rotate reversely through the gear train 23, 31, 32, 32a and 25. The jack shaft 30 is rotatably supported by bearings 35 and 36 secured to suitable stationary supporting structure.

An anti-friction bearing member 37 is disposed about the hub 38 of the gear 18 and a cylindrical housing bearing 39 engages about the outer side of the anti-friction bearing 37. The bearing structure 39 includes a substantially frusto-conical housing member 40 formed with an annular flange 41 secured by fastening devices 42 to the forward side of the ring gear 20. An anti-friction bearing 43 is disposed about the hub 44 of the beveled gear 21 and engages within a cylindrical rear housing member 45. The housing member 45 includes a frusto-conical body 46 formed with an annular flange 47 which is secured by means of the fastening devices 42 to the rear side of the ring gear 20. The housing structure including the parts 39, 40, 41, 42, 46 and 47 rotatably support the ring gear 20 about the gears 18 and 21.

A crank shaft 48 is disposed in offset parallel relation with respect to the shaft 15 being rotatably supported in a bearing 49 carried by a supporting structure 50. The crank shaft 48 has fixed thereto a spur gear or pinion 51 which is in constant mesh with the ring gear 20. The crank shaft 48 at its rear end has secured thereto or formed integral therewith a crank 52. The crank 52 has mounted on the offset crank shaft portion 53 thereof a plurality of radially arranged connecting rods 54. In practice, there are three of these connecting rods 54 mounted at their inner ends on the offset crank shaft 53. The upper or outer end of each crank shaft 54 has secured thereto a piston 55 which is slidable in a cylinder 56. The cylinder 56 is formed with an inner wall or partition 57 having an intake port 58 normally maintained in a closed position by means of a spring-pressed intake valve 59. The partition or head 57 is also formed with an outlet port 60 which is normally closed by a spring-pressed outlet valve 61. The cylinder 56 is provided with an outer head 62 through which the stems of the valves 59 and 61 slidably engage. The valve 59 is constantly urged to a closed position by means of a spring 63 and the valve 61 is normally urged to a closed position by means of a spring 64. A dividing wall 65 is carried by the head or partition 57 and divides the space between the wall 57 and the outer head 62 into an intake chamber 66 and an outlet chamber 67. The intake chamber 66 has connected therewith an intake pipe 68 and the outlet chamber 67 has connected therewith one end of an outlet pipe 69.

The fluid which is discharged from the cylinder 56 on the outward stroke of the piston 55 passes through the chamber 67 and through the exhaust or outlet pipe 69 into an intake chamber 70 formed in the outer end portion of a driven cylinder structure 71. The driven structure 71 is formed with an inner wall 72 having an inlet port 73 normally closed by an inlet valve 74. The valve 74 is constantly urged to a closed position by means of a spring 75. The stem of the valve 74 slidably engages through an outer head 76 which is detachably mounted on the outer end of the cylinder 71. A partition 77 is secured to the central portion of the partition 72 thereby dividing the space between the wall 72 and the head 76 into the intake chamber 70 and an outlet or exhaust chamber 78. The partition or wall 72 is also formed with an outlet port 79 normally maintained in a closed position by means of a spring-pressed valve 80. The valve 80 is urged to a normally closed position by means of a spring 81.

The cylinder 71 has slidably mounted therein a piston 82 which has one end of a connecting rod 83 secured thereto. In practice, there are three of these cylinders 71 and three connecting rods 83. The three connecting rods 83 are rotatably mounted on an offset crank shaft member 84 carried by an adjustable crank member 85. The crank member 85 is formed with a block or body 86 having a threaded bore 87 extending therethrough. A threaded shaft 88 threadably engages through the threaded bore 87 of the block 86 and has its outer end journalled in a bearing 89 carried by a gear 90. The gear 90 is in constant mesh with a spur gear 91 which is fixed to the shaft 15.

In order to provide a means whereby the throw of the crank member 85 may be varied so as to provide a braking means for the movement of the fluid from the cylinder 56 to the cylinder 71, I have provided a centrifugal crank member adjusting or controlling structure generally designated as 92. A countershaft 93 is disposed in parallel offset relation with respect to the two shafts 14 and 15 and has secured to one end thereof a spur gear 94 which is in constant mesh with the gearing 90. A second spur gear 95 is secured to the opposite end of the countershaft 93 and is in constant mesh with a gear 96, and the gear 96 has fixed thereto and extending rearwardly therefrom a splined hollow shaft 97. The shaft 97 at its forward portion is journalled in a bearing 98 carried by a stationary support 99. An inner shaft 100 is disposed at its forward portion within the hollow splined shaft 97 and has secured to its rear end a beveled gear or pinion 101. The threaded shaft 88 has fixed to its inner end a beveled gear 102 which meshes with the gear 101 so that upon rotation of the shaft 100, the shaft 88 will be rotated in one direction so as to move the crank member 85 radially in one direction with respect to the axial center of the gear 90 which constitutes not only a spur gear but also a crank carrier. The gear 90 has secured thereto a hollow stub shaft or bearing 103 which is rotatable in a stationary bearing 104 carried by a stationary support 105.

A hollow gear shaft 106 is disposed rotatably within the hollow shaft 103 and rotatably engages about the inner shaft 100. A bevel gear 107 is fixed to the hollow shaft 106 and meshes with the beveled gear 102 and also with an idler gear 108 which is rotatably carried by the gear 90 diametrically opposite the gear 102. The gear or pinion 101 also meshes with the idler gear 108.

In order to provide a means whereby a selected one of the shafts 100 or 106 may be held against rotation at the time the gear 90 is rotating so as to thereby move the crank member 85 radially along the threaded shaft 88, I have provided a stationary plate 109 which is slidably mounted on a plurality of horizontally disposed and circumferentially spaced apart bolts 110 which are fixed at one end thereof to the support 105. The plate 109 on its forward face has fixed thereto an annular brake element 111 and also has fixed to the rear face thereof an annular brake element 112. A braking plate 113 is keyed or otherwise fixed to the inner shaft 100 on the forward side of the plate 109, and the plate 113 has fixed to the rear face thereof a braking element 114 confronting the braking element 111. A plate 115 is fixed in any suitable manner to the forward end of the hollow shaft 106 and has fixed to the forward face thereof a braking element 116 of annular construction which confronts the annular braking element 112. The plate 109 is moved endwise by a centrifugal governor structure which includes an annulus 117 formed with a grooved inner face 118. The periphery of the plate 109 is formed with a V-shaped edge 120 engaging within the V-shaped channel 118 and ball bearings or anti-friction bearings 121 are interposed between the ring 117 and the periphery of the plate 109.

The ring 117 has fixed to the forward side thereof a plurality of forwardly extending ears 122 with which links 123 are pivotally connected. The links 123 are pivotally connected as at 124 to links 125 which at their forward ends are pivotally connected as at 126 to a sliding collar or plate 127 which is splined on the shaft 97. The links 123 and 125 form a toggle and the links 123 and 125 are constantly urged inwardly by means of opposed springs 128 which are secured at their outer ends to ears or lugs 129 carried by the inner edges of the links 125 and are also secured to ears 130 carried by a sliding ring 131 mounted on the splined shaft 97. The plate or annulus 127 has formed therewith a grooved shifting collar 132 with which a manually operable shifting fork 133 engages. The fork 133 includes a lever 134 which is pivotally mounted as at 135 on rearwardly extending ears 136 carried by the support 99. A link or fork shifting member 137 is connected with the upper end of the lever 134 and may be extended to a suitable point for manual operation in order to provide for the manual shifting of the controlling plate 109 in the desired direction.

The two valve members 74 and 80 are operated with the rotation of the gear 90 by means of a valve operating cam 138 which is fixed relative to the gear 90. A valve operating rod or lift 139 is slidably supported by guide members 140 carried by the support 105, and the upper end of the lift rod 139 has pivotally secured thereto a rock lever 141. The rock lever 141 is pivotally supported intermediate the ends thereof by means of an upwardly extending arm 142 which is fixed to the cylinder 71. The rear end of the valve operating lever 141 is pivotally secured to an upwardly extending bar or stem 143. The lower end of the stem 143 has secured thereto or formed integral therewith a cross-head 144 which is slidably connected to the upper ends of the valve stems of the valve members 74 and 80. The lift rod 139 is held in constant engagement with the cam member 138 by means of a spring 145 engaging about the rod 139 and bearing at one end against a guide member 140.

A collar 146 is fixed on the lift rod 139 so that when the lower end of the lift rod 139 engages the lower portion of the cam 138, the valve member 80 will be raised to an open position and the valve member 74 will be maintained in a closed position.

The outlet chamber 78 has connected therewith a pipe 147 which is connected to a fluid reservoir 148. The fluid reservoir 148 is connected with the intake pipe 68 and is provided with a filler cap 149 so that a predetermined quantity of liquid may be maintained in the reservoir 148. An air space 150 is maintained above the level of the liquid 151a within the reservoir 148 so as to cushion shocks to the working parts under conditions of rapid change in load, and also to smooth out the variations in the flow of fluid between pumps caused by the sinusoidal variations in the pumping rates of the pumps.

In order to provide a means whereby the operation of this device may be synchronized with the speed of the engine, I have provided a rockable cam plate 151 which is pivotally supported as at 152 forwardly of the support. The plate 151 is formed with a cam track 153 within which a pin or roller 154 is movable. The pin or roller 154 is carried by the forward bifurcated end of the rod or link 137 and the link 137 is slidable through a guide opening 155 formed in the support 99. An arm 156 is fixed relative to the cam plate 151 and has one end of a link 157 pivotally connected thereto. The opposite end of the link 157 is pivotally connected as at 158 to an intermediate portion of a throttle lever or pedal 159, and a spring 160 constantly urges the pedal 159 rearwardly. A throttle link or rod 161 is connected at one end to an intermediate portion of the pedal 159 and is coupled in a conventional manner (not shown) with the engine carburetor.

In the use and operation of this transmission, the driving shaft 10 is connected to a suitable drive mechanism and a driven shaft 11 is connected to a suitable driven structure. Assuming that a load is applied initially to the driven shaft 11 so as to hold this shaft against rotation, the rotation of the drive shaft 10 with the shafts 14 and 15 and the gear 18 will cause the pinions 19 to rotate. Rotation of the pinions 19 will effect rotation of the ring gear 20, which in turn will rotate the gear 51 and effect reciprocation of the radially arranged pumping pistons 55. The outward stroke of each piston 55 will force the valve member 61 to an open position and the liquid will flow from the outlet chamber 67 through the pipe 69 into the driven member 71. At this time, the cam 138 will maintain the intake valve 74 in an open position so that the pressure of the incoming fluid will force each driven piston 82 inwardly whose associated intake valve happens to be open. The pistons 82 will also be reciprocated by rotation of the gear 90, and on the outward stroke of the piston 82, the liquid in the cylinder 71 will be forced out through the pipe 147 in the direction of the reservoir 148 and returned to the pipe 68 where it is forced back into the cylinder 56 at the time the piston 55 is on its inward stroke.

As the drive shaft 10 increases in speed, the controlling structure 92 including the governor for regulating the endwise movement of the clutch plate 109 will be operated, thereby swinging the governor links 123 and 125 outwardly against the tension of the retracting springs 128. Outward movement of the links 123 and 125 will move the clutch member 109 into engagement with the clutch member 114 so as to thereby retard the rotation of the shaft 100 which is constantly rotating in one direction. At this time the shaft 106 is rotating in the same direction as the gear 90, due to the fact that clutch plate 115 is disengaged. Retarding of the rotation of the shaft 100 will hold the gear 101 against rotation and, at the same time, the gear 102 will rotate about the gear 101, thereby effecting rotation of the shaft 88.

Rotation of the shaft 88 by means of the gear 101 will cause the crank member 85 to move inwardly until the offset crank shaft 84 is substantially coaxial with the shaft 100. At the time the offset shaft 84 is coaxial with the shaft 100, there will be no reciprocation of the pistons 82 so that the fluid will be locked in the cylinder 71 and also in each cylinder 56. Retardation of reciprocation of each piston 55 will effect locking of the spur gear 51 and also a locking of the gear 20. When the gear 20 is locked or is retarded in its rotation, the driving from the shaft 15 will be from the gear 18 through the pinion gears 19 to the gear 21.

The underlying principle of the transmission is to provide an automatic means of varying the gear reduction between the drive mechanism and the load so that the load reflected on the drive mechanism through the transmission will always be equal, as closely as practical, to that which is required to allow the drive mechanism to operate at a speed of rotation consistent with maximum efficiency. Consider for example a given torque on the shaft 11. To provide this torque requires that the drive mechanism develop a certain number of horsepower. To develop this horsepower at maximum efficiency, there is a certain speed at which the drive mechanism must operate, especially if it is an internal combustion engine.

It is the intended purpose of the governor structure 92 so as to be synchronized with the drive mechanism control, through the sliding collar 127, the fork 133, the lever 134, the fork shifting member 137, through the synchronizing cam 151, that clutch plate 109 will be disengaged from the clutch members 116 and 114 when the proper balance between the torque on shaft 11 and drive mechanism has been established. For each setting of the drive mechanism control, there will be a corresponding setting of the sliding collar 127 upon the splined shaft 97 which will provide proper tension of the springs 128 to allow clutch member 109 to be disengaged when this condition of balance is reached; and for each rate of speed of the drive mechanism as determined by the drive mechanism control, there is upon shaft 11 a definite torque which it is the function of the transmission to maintain. This balance between the torque on shaft 11 may be upset by variations in load or variations in the drive mechanism control.

Consider a set of conditions as follows: With a given setting of the drive mechanism control, sliding collar 127 takes up a corresponding position on the splined shaft 97, and the balance between the torque on the shaft 11 and the drive mechanism is such that the clutch member 109 is disengaged from clutch members 116 and 114. Now consider that the load is increased with a consequent increase in torque on shaft 11. The drive mechanism is slowed down and the rate of rotation of the links 123 and 125 is decreased and the links are pulled in by springs 128. Clutch member 109 is forced rearwardly and engages clutch member 116 causing shaft 88 to turn in a direction, such as to cause crank member 85 to move outwardly, lengthening the strokes of pistons 82. This increases the pumping rate of cylinders 71, consequently increasing the pumping rate of cylinders 56, allowing the ring gear 20 to rotate at a higher rate, increasing the ratio of speeds of shaft 15 to shaft 11, thus allowing the drive mechanism to come up to its given speed to maintain the given torque on shaft 11, this torque having decreased to its given value on the increase in gear reduction. With the drive mechanism again regaining its given speed, the links 123 and 125 are again rotating at their former speed and open outward to their former position, pulling clutch member 109 forward and disengaging it from clutch member 116. Now the given balance between the torque on shaft 11 and the drive mechanism has been re-established.

Now consider that the load has decreased with a consequent decrease in torque on shaft 11. The drive mechanism now increases in speed and the rate of rotation of the links 123 and 125 is increased and the links are pulled outwardly by centrifugal force. The clutch member 109 is pulled forward and engages clutch member 114, causing gear 101 to turn gear 102 which causes shaft 88 to turn in a direction, such as to cause crank member to move inwardly shortening the strokes of the pistons 82. This decreases the pumping rate of the cylinders 71, consequently decreasing the pumping rate of cylinders 56, forcing the ring gear 20 to rotate more slowly, reducing the ratio of speeds of shaft 15 to shaft 11, increasing the load on the drive mechanism. This causes the drive mechanism to slow down to its given speed, reducing the rotation rate of links 123 and 125 which reduces the centrifugal force and allows springs 128 to pull them inwardly, disengaging clutch member 109 from clutch member 114. The balance between the torque on shaft 11 and the drive mechanism has again been established, the torque on shaft 11 having increased to its given value upon the decrease in gear reduction.

Let us consider that the drive mechanism control has been changed in a manner such as to increase the speed of the drive mechanism. In synchronization with the drive mechanism control, sliding collar 127 is moved in a rearward direction to a new position on splined shaft 97. The transmission now begins to function to establish and maintain a new and greater torque on shaft 11 to utilize the increase in power from the drive mechanism. With the movement of sliding collar 127 to its new position, clutch member 109 is forced rearwardly to engage clutch member 116 and retard its rotation. This causes gear 102 to revolve and to turn shaft 88 in a direction such as to force crank member 85 outwardly, thereby lengthening the strokes of pistons 82. This increases the pumping rate of the cylinders 71. Increasing the pumping rate of the cylinders 71 allows the cylinders 56 to pump faster and increases the speed of rotation of spur gear 51, allowing ring gear 20 to rotate at a higher rate and increases the ratio of speed of shaft 15 to shaft 11. The proper torque on shaft 11 is now established, and the driving mechanism comes up to the speed as determined by the adjustment of its control. When this speed is reached, links 123 and 125 move outwardly, pulling clutch member 109 in a forward direction, disengaging it from the clutch member 116. The balance between an increased drive mechanism speed and a correspondingly increased torque on shaft 11 has been established, and as the inertia of the load is overcome, the torque on shaft 11 begins to decrease, but as it decreases, the transmission functions to maintain this torque, and the balance between this torque and the drive mechanism, as previously explained in the case of a decrease in load.

Now consider that the drive mechanism control has been changed in a manner such as to decrease the speed of the drive mechanism. In synchronization with the drive mechanism control, sliding collar 127 is moved in a forward direction to a new position on the splined shaft 97. The transmission now begins to function to establish and maintain a new and lesser torque on shaft 11 to allow for the decreased power from the drive mechanism. With the movement of sliding collar 127 to its new position, the clutch member 109 is forced in a forward direction to engage the clutch member 114 and retard its rotation. This causes gear 102 to revolve and to turn shaft 88 in a direction such as to force the crank member 85 inward, thereby shortening the strokes of the pistons 82. This decreases the pumping rate of cylinders 71 of the driven pumps, retards the rate of flow of fluid and retards the rate of operation of the pistons 55 in the cylinders 56 of the driving pump, increases the braking force on the crank 52, which through the gear 51 retards the rotation of the ring gear 20. The ratio of the speed of shaft 15 to the speed of shaft 11 now is reduced, increasing the load on the drive mechanism until its speed is reduced to that consistent with the new adjustment of its control. When this speed is reduced to its proper value, the reduced centrifugal force on links 123 and 125 allows springs 128 to pull them inward, disengaging the clutch member 109 from the clutch member 114. The proper balance between the torque on shaft 11 and the drive mechanism has at this time been reached. As the load loses its momentum, the torque on shaft 11 begins to increase, but as it increases, the transmission functions to maintain this torque, and the balance between this torque and the drive mechanism. The manner in which this is done is as previously explained in the case of an increase in load.

What I claim is:

1. In a hydraulic transmission, a planetary gearing for coupling a drive shaft with a driven shaft, a series of reciprocal pumping members, means connecting said members with said transmission for operation thereby, a second series of pumping members, means communicating said first pumping members with said second pumping members, and means connecting said second pumping members with the drive shaft, said latter means including a rotatable combined gear and crankshaft carrier, a common crankshaft for said second series of pumping members, a threaded shaft radially mounted in said carrier, said crankshaft having a radially threaded portion cooperating with said threaded shaft, and centrifugal means connected with said carrier for effecting axial rotation of said threaded shaft to thereby adjust the throw of said crankshaft in accordance with the speed of said drive shaft, said latter means including a bevelled gear carried by said supporting means, opposed bevelled gears meshing with said first gear, opposed clutch elements fixed one to each of said opposed gears, an intermediate clutch element between said opposed clutch elements, spring means constantly urging said intermediate clutch element into engagement with one of said opposed elements, and centrifugally operated means for shifting said intermediate clutch element into engagement with the other opposed element.

2. In a hydraulic transmission, a planetary gearing for coupling a drive shaft with a driven shaft, a series of reciprocal pumping members, means connecting said members with said transmission for operation thereby, a second series of pumping members, means communicating said first pumping members with said second pumping members, means connecting said second pumping members with the drive shaft, said latter means including a rotatable combined gear and crank shaft carrier, a common crank shaft for said second series of pumping members, a threaded shaft radially mounted in said carrier, said crankshaft having a radially threaded portion cooperating with said threaded shaft, centrifugal means connected with said carrier for effecting axial rotation of said threaded shaft to thereby adjust the throw of said crank shaft in accordance with the speed of said drive shaft, said latter means including a bevelled gear carried by said radial shaft, opposed bevelled gears meshing with said first gear, opposed clutch elements fixed one to each of said opposed gears, an intermediate clutch element between said opposed clutch elements, spring means constantly urging said intermediate clutch element into engagement with one of said opposed elements, and centrifugally operated means for shifting said intermediate clutch element into engagement with the other opposed element, and means connected with said centrifugal means for synchronizing the operation of said centrifugal means with the speed of the engine.

3. In a hydraulic transmission, a planetary gearing for coupling a drive shaft with a driven shaft, a series of reciprocal pumping members, means connecting said members with said transmission for operation thereby, a second series of pumping members, means communicating said first pumping members with said second pumping members, means connecting said second pumping members with the drive shaft, said latter means including a rotatable combined gear and crankshaft carrier, a common crankshaft for said second series of pumping members, a threaded shaft radially mounted in said carrier, said crankshaft having a radially threaded portion cooperating with said threaded shaft, centrifugal means connected with said carrier for effecting axial rotation of said threaded shaft to thereby adjust the throw of said crankshaft in accordance with the speed of said drive shaft, said latter means including a bevelled gear carried by said radial shaft, opposed bevelled gears meshing with said first gear, opposed clutch elements fixed one to each of said opposed gears, an intermediate clutch element between said opposed clutch elements, spring means constantly urging said intermediate clutch element into engagement with one of said opposed elements, and centrifugally operated means for shifting said intermediate clutch element into engagement with the other opposed element, and manually adjustable means connected with said centrifugal means for synchronizing the operation of said centrifugal means with the speed of the engine.

HENRY HAGEN.